United States Patent
Kiel et al.

(10) Patent No.: US 8,302,669 B2
(45) Date of Patent: Nov. 6, 2012

(54) LOUVRE FOR AN AIR-CONDUCTION HOUSING OF A VEHICLE AIR-CONDITIONING SYSTEM

(75) Inventors: Ronny Kiel, Leinfelden-Oberaichen (DE); Wolfgang Dieksander, Steinheim (DE); Erich Litwing, Spraitbach (DE)

(73) Assignee: BEHR GmbH & Co. KG, Stuttgart (DE)

( * ) Notice: Subject to any disclaimer, the term of this patent is extended or adjusted under 35 U.S.C. 154(b) by 582 days.

(21) Appl. No.: 12/538,380

(22) Filed: Aug. 10, 2009

(65) Prior Publication Data
US 2009/0318070 A1 Dec. 24, 2009

Related U.S. Application Data

(63) Continuation of application No. 10/562,921, filed as application No. PCT/EP2004/006634 on Jun. 18, 2004, now abandoned.

(30) Foreign Application Priority Data

Jun. 30, 2003 (DE) .................................. 103 29 582
Feb. 20, 2004 (DE) .......................... 10 2004 008 818

(51) Int. Cl.
  *B60H 1/00* (2006.01)
(52) U.S. Cl. ............ 165/42; 165/43; 454/127; 454/144; 454/154; 454/156; 454/305
(58) Field of Classification Search .................... 165/41, 165/42, 43, 44, 202, 203, 204; 454/124, 454/127, 144, 154, 156, 305
See application file for complete search history.

(56) References Cited

U.S. PATENT DOCUMENTS

| | | | |
|---|---|---|---|
| 3,264,971 | A | 8/1966 | Dangauthier |
| 4,610,196 | A | 9/1986 | Kern |
| 4,938,122 | A | 7/1990 | Ziemba |
| 5,643,080 | A | 7/1997 | Kondoh et al. |
| 5,902,181 | A | 5/1999 | Bain |
| 6,695,691 | B1 | 2/2004 | Le |
| 2003/0037918 | A1 | 2/2003 | Lee et al. |

FOREIGN PATENT DOCUMENTS

| | | |
|---|---|---|
| DE | 1454642 | 2/1969 |
| DE | 195 01 593 | 7/1995 |
| DE | 19518280 A1 | 12/1995 |
| DE | 10106774 A1 | 8/2002 |
| DE | 101 47 112 | 4/2003 |
| FR | 2 765 526 | 1/1999 |
| FR | 2 771 343 | 5/1999 |
| FR | 2 786 134 | 5/2000 |
| FR | 2788019 A1 | 7/2000 |
| FR | 2798322 A1 | 3/2001 |
| GB | 2 168 786 A | 6/1986 |

OTHER PUBLICATIONS

Ronny Kiel et al., U.S. PTO Office Action, U.S. Appl. No. 10/562,921, May 8, 2009, 9 pgs.
Ronny Kiel et al., U.S. PTO Office Action, U.S. Appl. No. 10/562,921, Oct. 6, 2008, 16 pgs.

*Primary Examiner* — Ljiljana Ciric
(74) *Attorney, Agent, or Firm* — Foley & Lardner LLP (57) ABSTRACT

A louver for an air-conduction housing of a motor vehicle air-conditioning system includes a plurality of regions. The plurality of regions are arranged directly adjacent to one another to facilitate air stratification and are subdivided by partitions which are part of the louver. At least one of the regions is configured as a drum-type louver.

13 Claims, 9 Drawing Sheets

LOUVRE FOR AN AIR-CONDUCTION HOUSING OF A VEHICLE AIR-CONDITIONING SYSTEM

CROSS-REFERENCE TO RELATED PATENT APPLICATIONS

This application is a Continuation of U.S. application Ser. No. 10/562,921, filed Dec. 29, 2005, now abandoned, which is the National Stage of International Application No. PCT/EP2004/006634, filed Jun. 18, 2004, which is based upon and claims the benefit of priority from prior Federal Republic of Germany Patent Application No. 103 29 582.8, filed Jun. 30, 2003, and Federal Republic of Germany Patent Application No. 10 2004 008 818.7, filed Feb. 20, 2004, the entire contents of all of which are incorporated herein by reference in their entirety.

The invention relates to a louver for an air-conduction housing of a motor vehicle air-conditioning system and to a heating or air-conditioning device.

BACKGROUND

Conventionally, a plurality of louvers which control the air flow in different air ducts are used in air-conduction housings. This is the case particularly when a stratified flow is to be generated, for which purpose cold air and warm air are mixed in a controlled way, in regions, so as to form temperature stratification, and, in regions, are conducted parallel to one another. For this purpose, conventionally, a plurality of air ducts are designed correspondingly, the louvers being arranged in these and, as a rule, so as to be spaced apart from one another and generally being activated individually as a function of one another and being actuated by a servomotor.

Furthermore, a louver of correspondingly subdivided design may be used, in which case the louver is subdivided by partitions of the air-conduction housing which separate the air ducts from one another. A louver of this type consisting of individual regions formed separately from one another is simpler to control, but still leaves desires, particularly with regard to the construction space requirement, unsatisfied.

SUMMARY OF THE PREFERRED EMBODIMENTS

The object of the invention is to make available an improved louver for an air-conduction housing of a motor vehicle air-conditioning system, and at the same time, in particular, the utilization of the construction space is to be optimized and the cross section of the cold-air path is to be obstructed as little as possible.

According to the invention, a louver for an air-conduction housing of a motor vehicle air-conditioning system is provided, the louver having, to allow air stratification, a plurality of regions which are directly adjacent to one another and are subdivided by partitions which, in contrast to conventional louvers, are not part of the air-conduction housing, but are part of the louver, so that the louver itself forms air ducts which, in a corresponding louver position, guide the air in a controlled way and supply it to further air ducts. By the partitions being integrated in a louver in the region of the latter, the construction space requirement is reduced, since the partitions provided in the case of conventional louvers may be dispensed with.

The louver preferably has two outer regions and a middle region lying between them. In this case, the louver is preferably designed mirror-symmetrically with respect to the center plane which extends perpendicularly with respect to the pivot axis. In this case, preferably, the flow cross section of the two outer regions is approximately as large as the flow cross section of the middle region.

Preferably, the louver has at least one region with a configuration in the manner of a drum-type louver, that is to say, in this region, the outer wall of the louver is arranged preferably concentrically with respect to the pivot axis of the louver.

Preferably, moreover, the louver has at least one region which is planar and runs parallel with respect to the pivot axis and/or is curved toward the pivot axis and which is preferably a middle region.

At least two of the different regions of the louver preferably extend over a different distance with respect to the circumference of the latter.

Preferably, at least one region of the louver has, on at least one side, an end running obliquely with respect to the pivot axis, so that, during a rotation of the louver, the air passage is opened slowly. In this case, this end may be straight or else have any other, in particular arcuate profile. In this case, in particular, a control characteristic can be integrated into the configuration of the louver in a simple way, so that the corresponding actuating movement can be simplified.

To increase stability, the louver preferably has a bridge, in particular in a planar or slightly curved region, said bridge connecting the partitions of a region to one another. In this case, the bridge may be of curved design for the purpose of performing a guide function.

For sealing off in at least one end position, the louver preferably has at least one outwardly extending edge which, in this end position, bears sealingly against the air-conduction housing at a corresponding bearing point. Additional sealing means, such as, for example, elastic sealing elements, may be provided at this edge.

To optimize the sealing function, the edge preferably extends beyond the end faces, if possible as far as the pivot axis or the corresponding mounting.

The louver is preferably produced in one piece, in particular as a plastic injection molding. Such a design allows cost-effective production.

Owing to the special design of the louver, for example obliquely running ends of individual regions of the louver, edges which project outward, individual regions extending over a different distance with respect to the circumference of the louver, along with a corresponding configuration of the air-conduction housing, regulation is simplified, since essential regulation characteristics are already contained in the louver form and in the air-conduction housing form cooperating with this, so that the actuating movement is simplified and therefore simpler servomotors and/or simpler controls can be used.

The invention is explained in detail below by means of an exemplary embodiment, with reference to the drawing in which:

DETAILED DESCRIPTION

A motor vehicle air-conditioning system 1 with a blower 2, with an evaporator 3, with a heater 4 and with an additional heater 5, which are arranged in an air-conduction housing 7 of multipart design, has a mixing louver 6 for the on-demand thermal control and generation of a stratified air flow.

The thermally controlled air can be supplied to various regions of the vehicle interior via air ducts regulated by means of louvers. Thus, an air duct 8 is provided which branches off from the air-conduction housing 7 and which serves for defrosting the windshield. The air quantity conducted through the defrosting air duct 8 is regulated by means of a defrosting louver 9. A further air duct 10 leads to the side and middle nozzles and can be regulated by means of a louver 11. Furthermore, a foot-space air duct 12 is provided which can be regulated by means of a foot-space louver 13.

Figure 1:
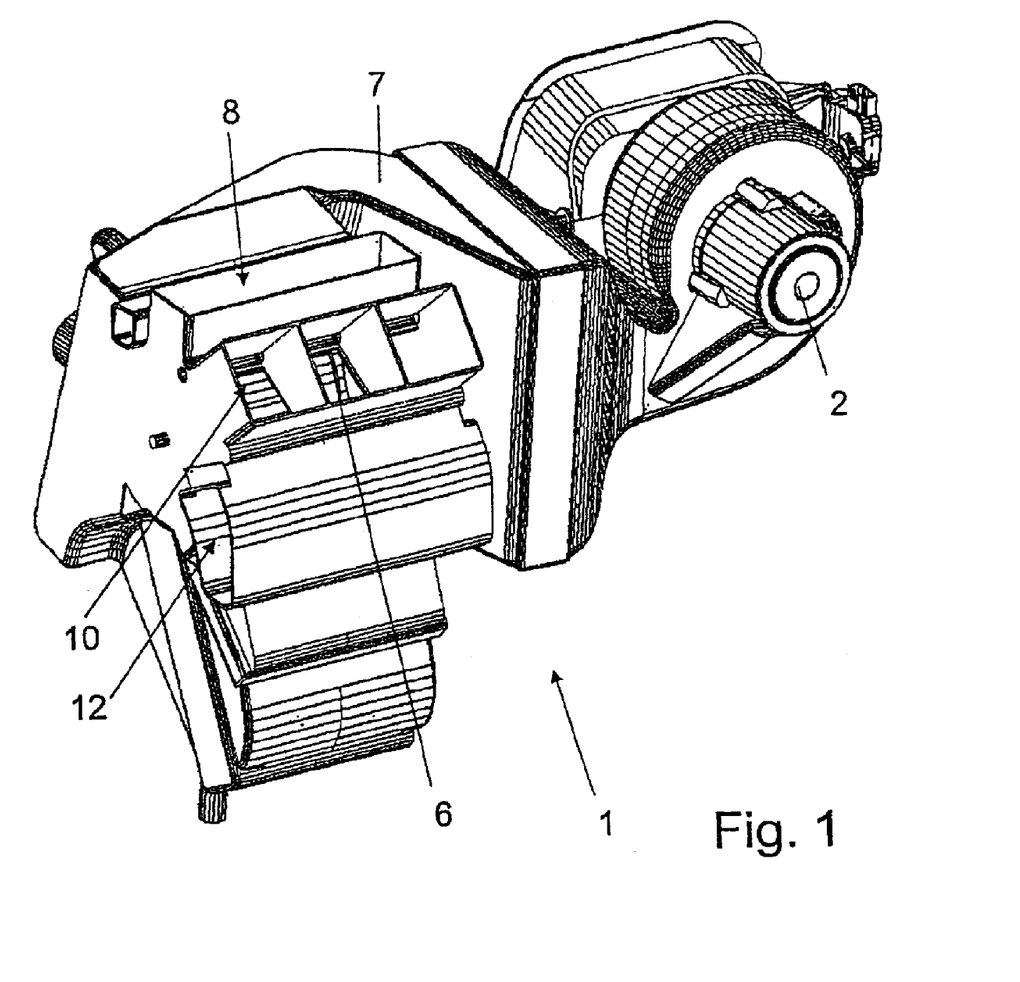
FIG. 1 shows a perspective view of an air-conduction housing.
Figure 2:
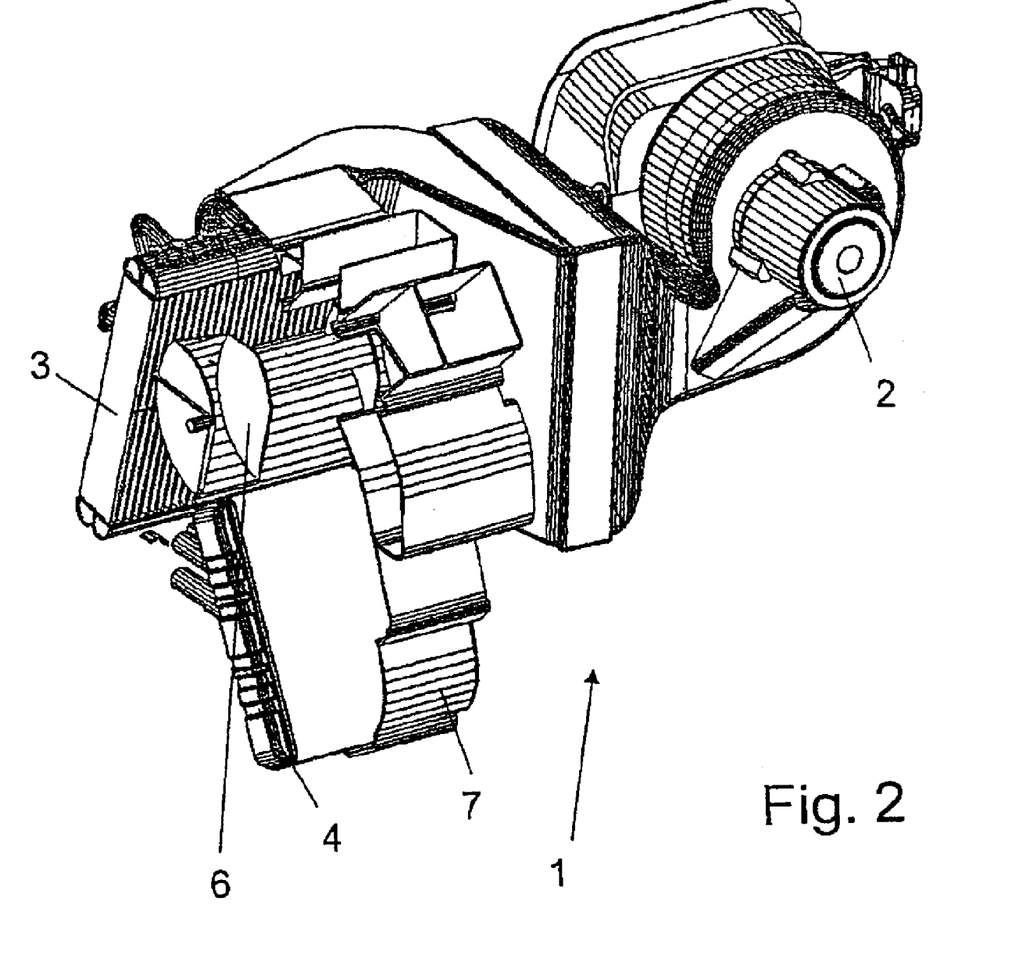
FIG. 2 shows the air-conduction housing of FIG. 1, cut away in regions, from the same perspective.

As is evident from FIG. 1, the ventilation air duct 10 is designed in three parts, in the present case the three subducts having in each case approximately the same cross section. They serve, in cooperation with the louver 6, for air stratification between the middle and the side nozzle.

Figure 12:
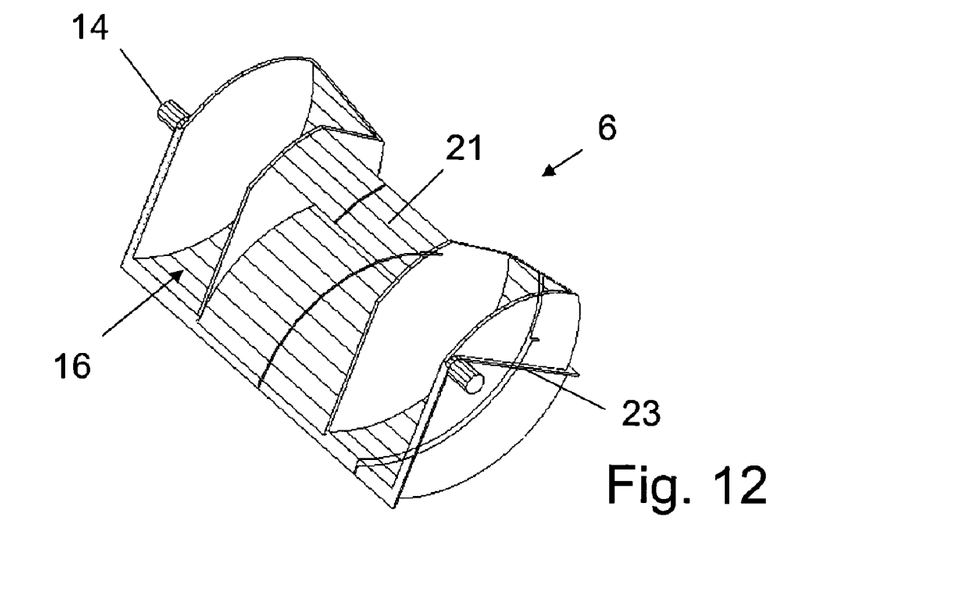
FIG. 12 shows the view of FIG. 11 with an illustration of the sectional lines of FIGS. 3 to 10.

In order to make this air stratification possible by means of a single louver which makes partitions or specially designed cold-air ducts unnecessary and therefore has a somewhat lower construction space requirement, the three-part louver 6 according to the present exemplary embodiment is provided. This has, in its pivot axis, two tenons 14 which are arranged on the end faces 15. The louver 6 is designed mirror-symmetrically with respect to a plane running perpendicularly with respect to the pivot axis in the center of the louver 6, the sectional lines of this plane with the louver 6 being illustrated in FIG. 12.

The louver 6, by virtue of its symmetry, has two outer regions 16 and a middle region 17. It is designed in the manner of a drum-type louver in its outer regions 16, that is to say the louver 6 has the configuration of part of a hollow cylinder. On a side 18 extending in the longitudinal direction of the louver 6, the regions 16 and 17 terminate at the same height, there being provided, for better sealing off, a radially outwardly extending edge 19 which also extends beyond the end faces 15 as far as the tenons 14. According to the present exemplary embodiment, the flow cross section of the two outer regions 16 together corresponds approximately to the flow cross section of the middle region 17.

The middle region 17 is designed to be curved or concave in the direction of the pivot axis and is separated from the lateral regions 16 by walls 20. At the end of the walls 20 which is on the pivot-axis side, these are connected by means of a bridge 21, the latter being curved slightly according to the middle region 17. This bridge 21 serves, on the one hand, as a kind of spoiler with an air guide function and, on the other hand, for increasing the stability of the louver 6.

Figure 13:
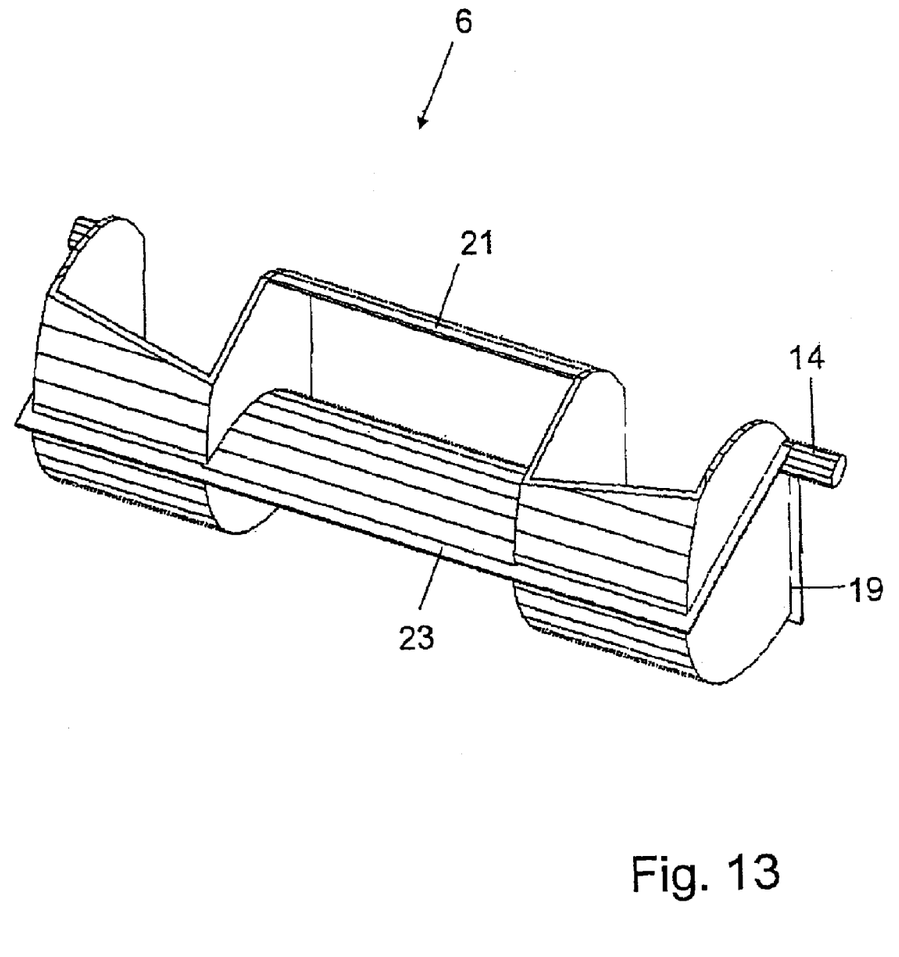
FIG. 13 shows the louver from another perspective.
Figure 14:
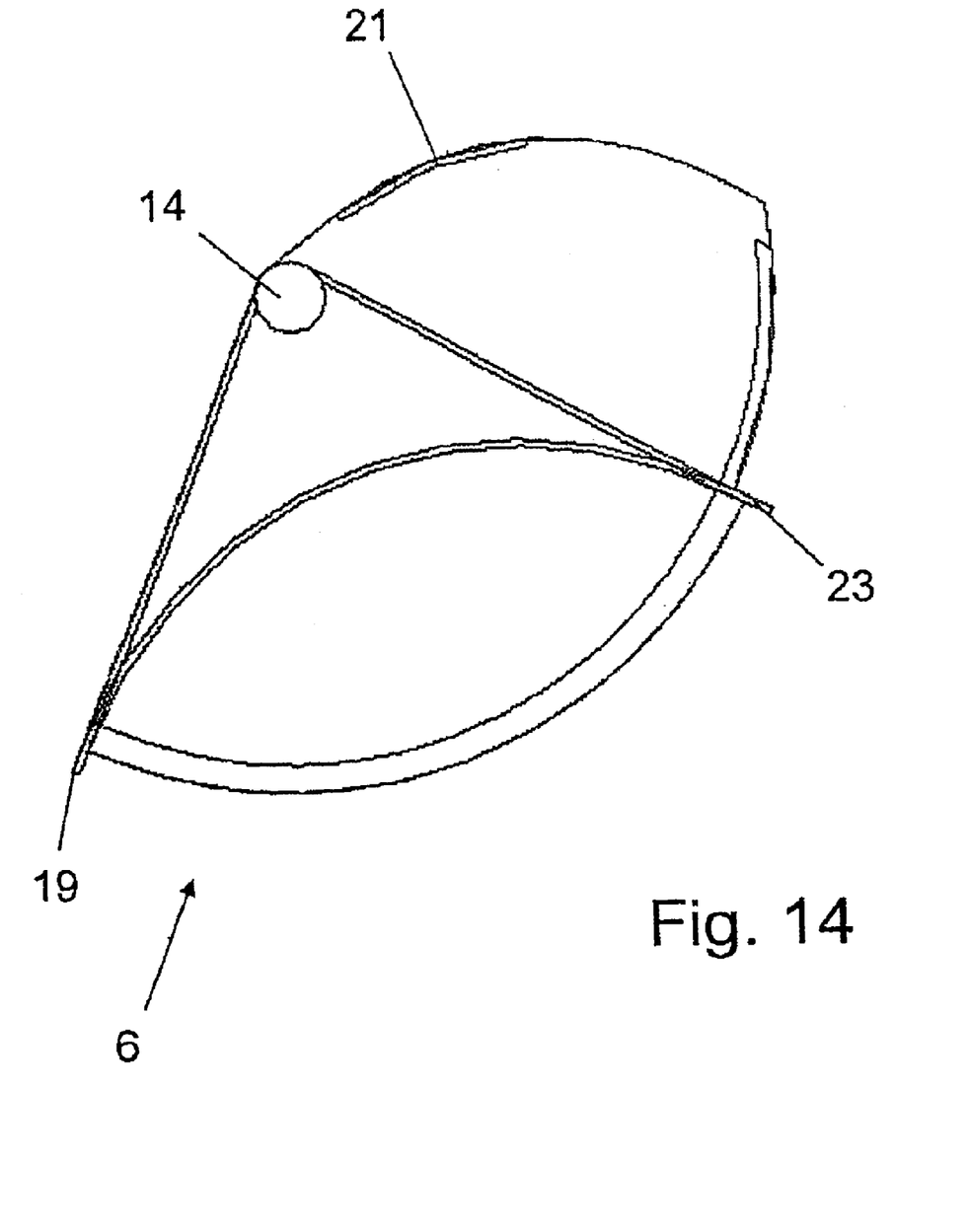
FIG. 14 shows a cross section through the louver.

On that side 22 of the louver 6 which lies opposite the side 18, the regions 16 and 17 terminate at different heights, as is evident particularly from FIG. 13. To improve the opening behavior, the outer regions 16 are of beveled design, that is to say, in particular, they do not run parallel with respect to the pivot axis. The middle region 17 terminates parallel to the pivot axis, again an outwardly extending edge 23 being provided, which also extends beyond the outside of the outer regions 16 and the end faces 15 as far as the tenons 14 and therefore as far as the edge 19.

The functioning of the louver 6 is explained in more detail below with reference to FIGS. 3 to 10.

Figure 3:
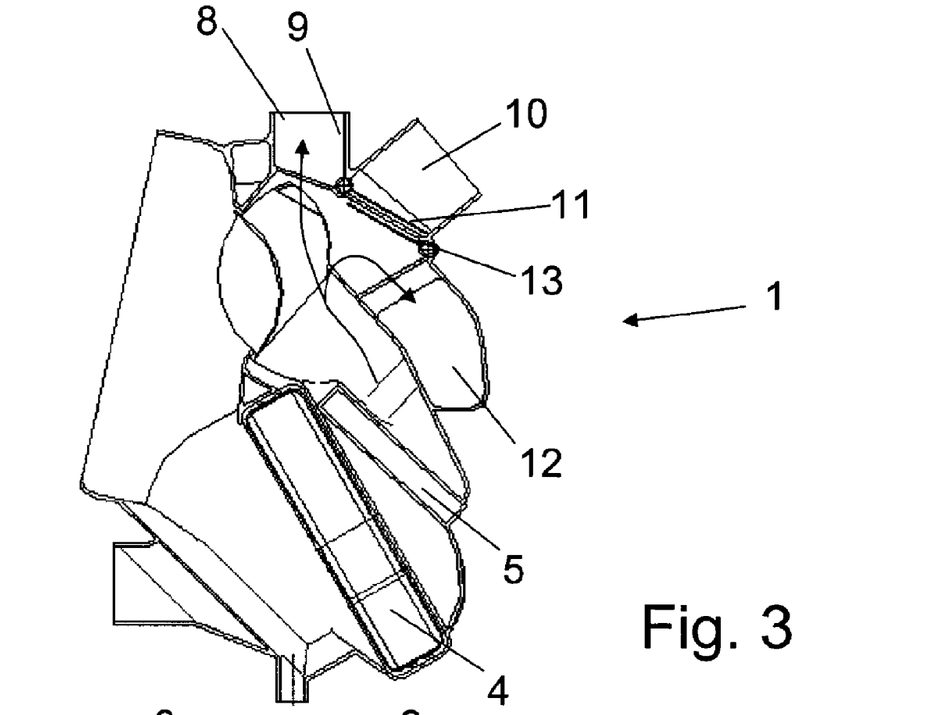
FIG. 3 shows a section through the air-conduction housing in the center of the louver in the 100% warm louver position.
Figure 4:
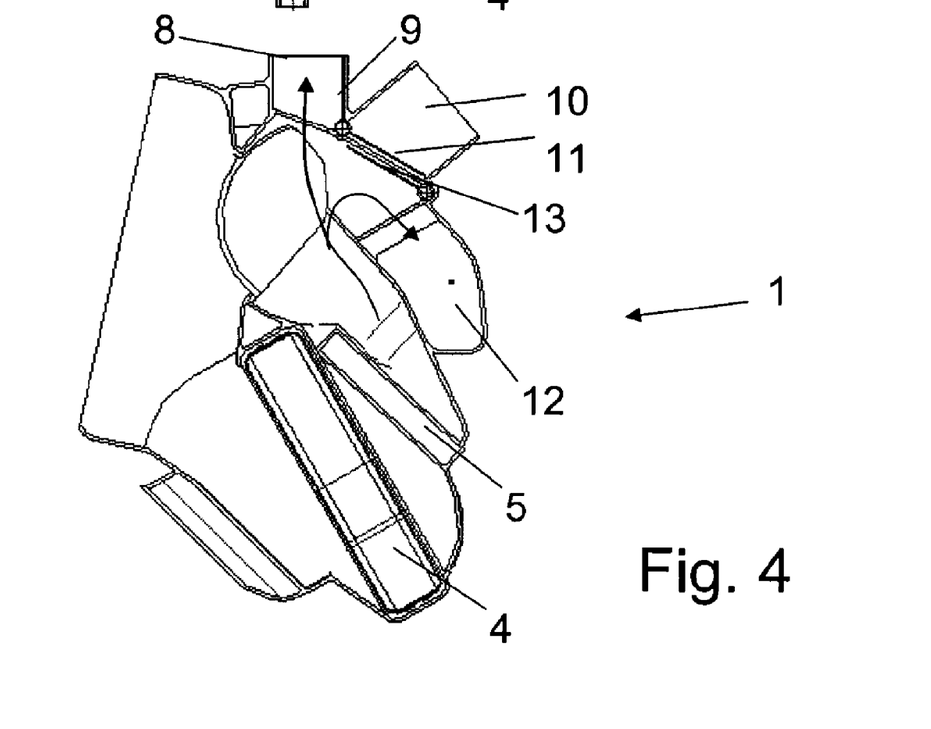
FIG. 4 shows a section through the air-conduction housing in the lateral region of the louver in the louver position of FIG. 3.

FIGS. 3 and 4 show the 100% warm position, that is to say the louver 6, with all the regions 16 and 17, closes the path for the cold air coming directly from the evaporator 3. In this case, the louver 6 bears with its edge 19 against the correspondingly designed air-conduction housing 7, so that no cold air can arrive at the air ducts 8 and 12. The flow path of the warm air coming from the heater 4 and additional heater 5 is illustrated by means of unbroken arrows for the situation where the defrosting and foot-space louvers 9 and 13 are open. The louver 11 for the supply of air to the side and middle nozzles is closed according to the illustration.

Figure 5:
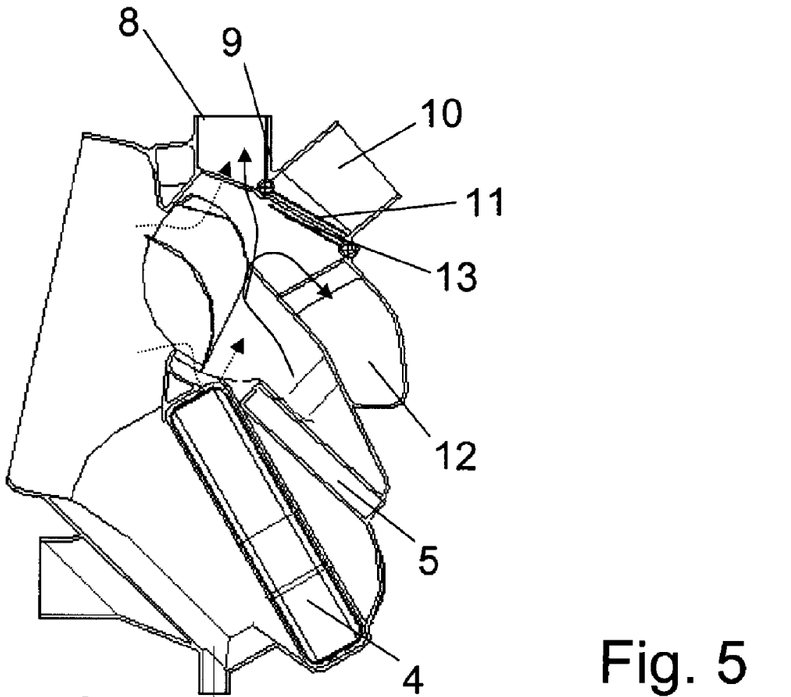
FIG. 5 shows a section through the air-conduction housing in the center of the louver in the 75% warm louver position.
Figure 6:
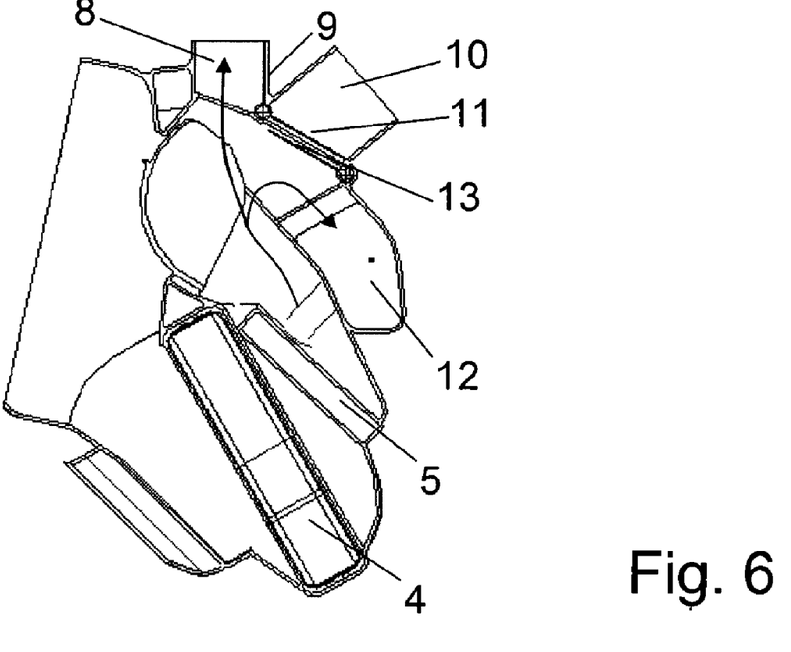
FIG. 6 shows a section through the air-conduction housing in the lateral region of the louver in the louver position of FIG. 5.

When the louver 6 is moved slowly into its other end position, as illustrated in FIGS. 5 and 6, then, in the middle region 17 of the louver 6, a cold-air passage is released on both sides, through which cold air flows, in particular, into the defrosting air duct 8. What is achieved thereby is that the temperature of the air which is guided into the foot space is higher than the temperature of the air which passes into the defrosting air duct 8. Since the outer regions 16 are designed to be wider, the cold-air passage in these regions is still closed. The flow path of the cold air is illustrated in the drawing by means of dotted arrows.

Figure 7:
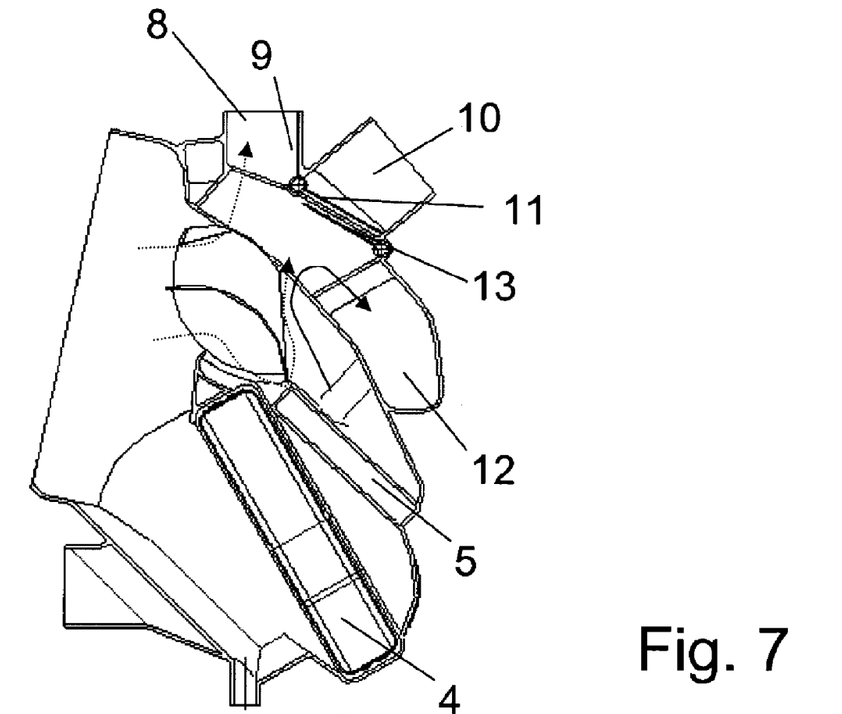
FIG. 7 shows a section through the air-conduction housing in the center of the louver in the 50% warm louver position.
Figure 8:
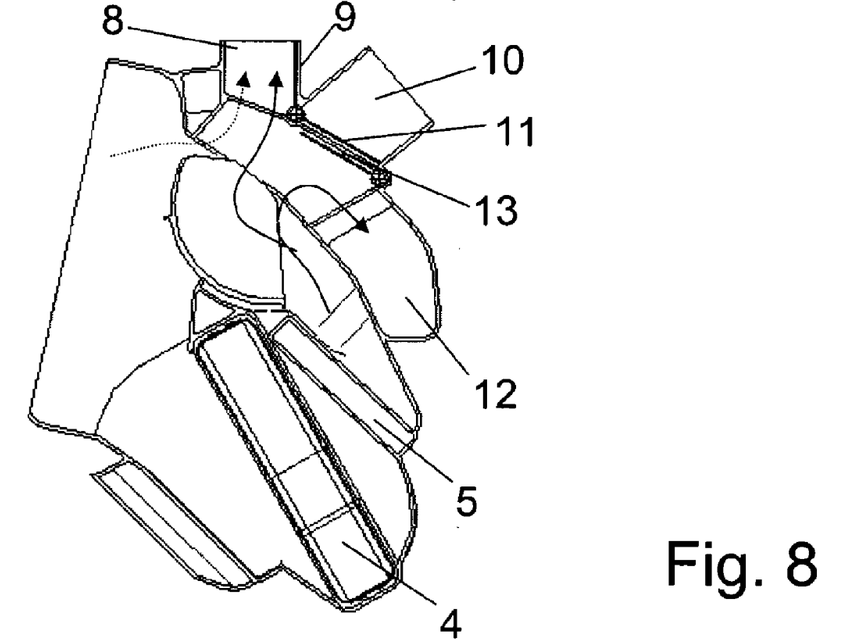
FIG. 8 shows a section through the air-conduction housing in the lateral region of the louver in the louver position of FIG. 7.

In the event of a further movement of the louver 6, as illustrated in FIGS. 7 and 8, the cold-air passage in the middle region 17 is opened increasingly more widely, so that the temperature falls further. In the outer regions 16, the cold-air passages slowly begin to open on account of the beveling, and, in the outer regions 16, cold air arrives, in particular, at the defrosting air duct 8. Here, too, temperature stratification giving the passenger a pleasant feeling is achieved, in that the temperature of the air which is guided into the foot space is higher than the temperature of the air which enters the defrosting air duct 8.

With louver positions which cause opening or at least partial opening of the air duct 10 (not illustrated in FIGS. 3 to 8), temperature stratification between middle and side air ducts is obtained. By virtue of the described form of the louver 6, the temperature of the air which is supplied to the middle nozzle or middle nozzles is lower than the air temperature in the side nozzles, thus likewise contributing to an increase in comfort in the interior, since the radiation of heat via the side windows is higher than in the middle of the passenger space, and the temperature stratification described brings about an equalization of at least the temperature profile felt by the passenger.

Figure 9:
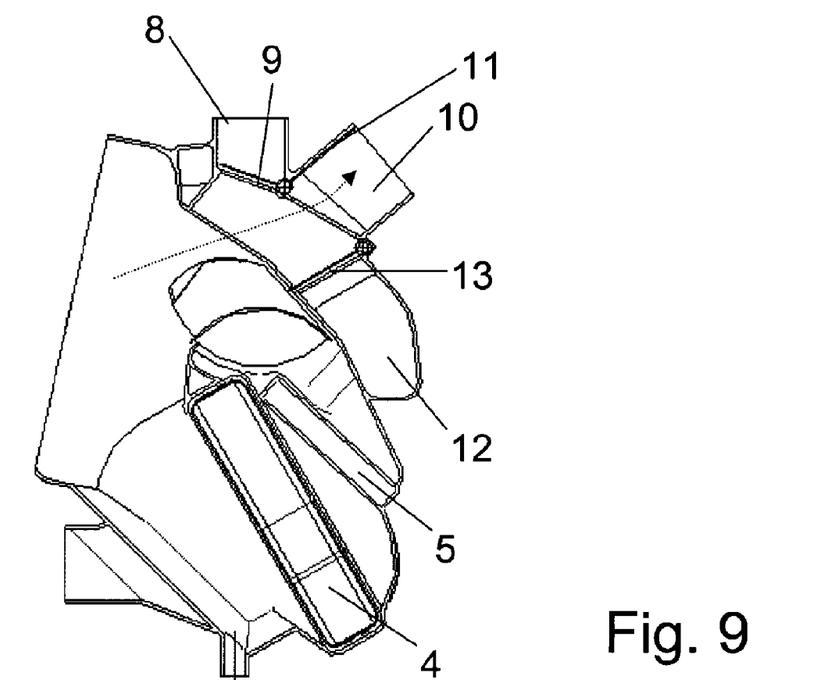
FIG. 9 shows a section through the air-conduction housing in the center of the louver in the 0% warm louver position.
Figure 10:
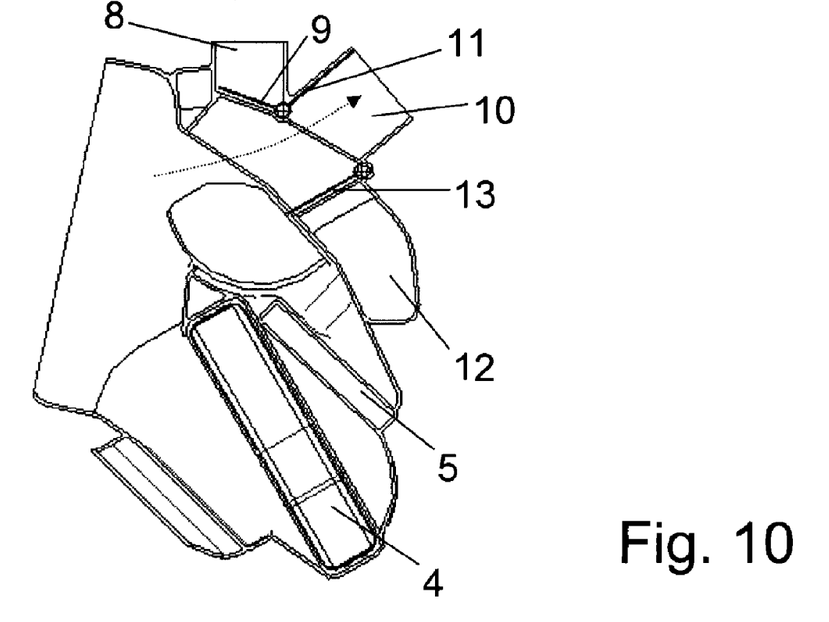
FIG. 10 shows a section through the air-conduction housing in the lateral region of the louver in the louver position of FIG. 9.
Figure 11:
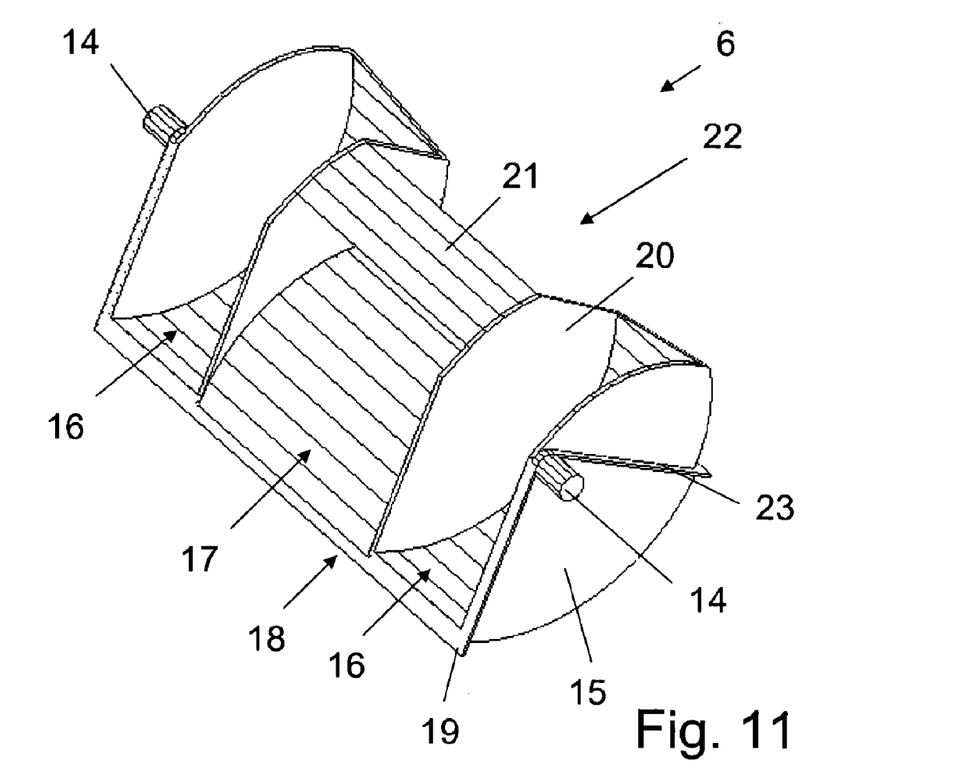
FIG. 11 shows a perspective view of the louver.

When the warm-air passage is closed completely, as in FIGS. 9 and 10, cold air arrives at the corresponding air ducts 8, 10 and 12 in all the regions 16 and 17. In this case, in the exemplary embodiment illustrated, both the defrosting air duct 9 and the air duct 12 into the foot space are closed, and only uniformly cold air enters the ducts 10 with the side and middle nozzles.

A stratification of the air can thus be made possible, and, in all the mixed or intermediate positions of the louver 6, the air supplied to the windshield is colder than the air supplied to the foot space or the air supplied to the middle nozzles is colder than the air supplied to the side nozzles.

The invention claimed is:

1. An air-conditioning system for a motor vehicle comprising:
    an air-conduction housing;
    an evaporator; and
    a louver for the air-conduction housing that pivots, the louver configured to enable air stratification and temperature control,
    wherein the louver includes:
        an edge, and
        a plurality of regions along a pivot axis of the louver that are directly adjacent to one another and are subdivided by partitions of the louver,
    wherein at least one of the plurality of regions is configured as a drum-type louver and is arranged concentrically with respect to the pivot axis,
    wherein at least one of the other of the plurality of regions is curved in a direction toward the pivot axis,
    wherein the louver in an end position is configured to close a path of cold air coming directly from the evaporator with the plurality of regions and the edge abutting the air-conduction housing.

2. The air-conditioning system for a motor vehicle as claimed in claim 1, wherein the plurality of regions comprise two outer regions and a middle region between the two outer regions.

3. The air-conditioning system for a motor vehicle as claimed in claim 2, wherein a first flow cross section of the two outer regions corresponds to a second flow cross section of the middle region.

4. The air-conditioning system for a motor vehicle as claimed in claim 1, wherein the louver is designed mirror-symmetrically.

5. The air-conditioning system for a motor vehicle as claimed in claim 1, wherein at least two of the plurality of regions extend over a different distance with respect to a circumference of the louver.

6. The air-conditioning system for a motor vehicle as claimed in claim 1, wherein at least one of the plurality of regions includes, on at least one side, an end running obliquely with respect to the pivot axis.

7. The air-conditioning system for a motor vehicle as claimed in claim 1, wherein the louver further includes a bridge which connects the partitions of the plurality of regions to one another.

8. The air-conditioning system for a motor vehicle as claimed in claim 7, wherein the bridge is curved.

9. The air-conditioning system for a motor vehicle as claimed in claim 1, wherein the louver further includes at least one outwardly extending edge.

10. The air-conditioning system for a motor vehicle as claimed in claim 1, wherein the louver further includes end faces, the edge extending beyond the end faces.

11. The air-conditioning system for a motor vehicle as claimed in claim 1, wherein the louver comprises a one-piece construction.

12. The air-conditioning system for a motor vehicle as claimed in claim 1, wherein the louver comprises a plastic made by injection molding.

13. The air-conditioning system for a motor vehicle as claimed in claim 1, wherein the air-conditioning system further comprises at least one of a heat exchanger, a heating body, a filter, a temperature mixing louver, a mixing chamber, one or more flow ducts and one or more control louvers for distributing air to outlet ducts.

* * * * *